United States Patent
Loprieno et al.

(10) Patent No.: US 8,149,871 B2
(45) Date of Patent: Apr. 3, 2012

(54) POINTER OFFSET MECHANISM ENABLING COST EFFECTIVE SONET/SDH MAPPING/DEMAPPING OVER ETHERNET

(75) Inventors: Gilberto Loprieno, Milan (IT); David Bianchi, Cambiago (IT); Giacomo Losio, Tortona (IT)

(73) Assignee: Cisco Technology, Inc., San Jose, CA (US)

(*) Notice: Subject to any disclaimer, the term of this patent is extended or adjusted under 35 U.S.C. 154(b) by 134 days.

(21) Appl. No.: 12/370,615

(22) Filed: Feb. 13, 2009

(65) Prior Publication Data

US 2010/0209111 A1   Aug. 19, 2010

(51) Int. Cl.
    *H04J 3/22* (2006.01)
(52) U.S. Cl. .......................... 370/466; 398/45
(58) Field of Classification Search .......... 370/466–467; 398/45–57
    See application file for complete search history.

(56) References Cited

U.S. PATENT DOCUMENTS

| | | | |
|---|---|---|---|
| 5,535,219 A * | 7/1996 | Freitas | 370/509 |
| 5,717,693 A | 2/1998 | Baydar | |
| 6,122,281 A * | 9/2000 | Donovan et al. | 370/401 |
| 6,463,111 B1 * | 10/2002 | Upp | 375/372 |
| 6,891,863 B1 * | 5/2005 | Penkler et al. | 370/539 |
| 7,016,344 B1 * | 3/2006 | Martin | 370/359 |
| 7,103,052 B2 | 9/2006 | Shiraski | |
| 7,349,444 B2 | 3/2008 | Upp | |

OTHER PUBLICATIONS

Cisco—Monitor Synchronization Performance and Troubleshoot Timing Alarms on ONS 15454, Jan. 5, 2006 available on the Web at http://www.cisco.com/application/pdf/paws/65121/syncperf_alarm15454.pdf.

Efficient and Flexible Transport of Next-Generation Data Services Over SONET/SDH Using GFP, VCAT and LCAS, 1992-2005 Cisco Systems, Inc available on the Web at http://www.cisco.com/asiapac/campaigns/metroethernet/files/sonet_sdh_using_gfp_vcat_lcas.pdf.

SONET Graphical Overview, 2008-2009 Cisco Systems, Inc. available on the Web at http://www.cisco.com/application/pdf/paws/28081/sonet_28081.pdf.

* cited by examiner

*Primary Examiner* — Hassan Kizou
*Assistant Examiner* — Charles C Jiang
(74) *Attorney, Agent, or Firm* — Charles E. Krueger

(57) ABSTRACT

In one embodiment, a SONET/SDH over Ethernet demapping point utilizes a pointer offset mechanism for clock recovery and timing. The pointer offset is determined by the difference between a client clock and a reference clock.

15 Claims, 8 Drawing Sheets

POINTER OFFSET MECHANISM ENABLING COST EFFECTIVE SONET/SDH MAPPING/DEMAPPING OVER ETHERNET

TECHNICAL FIELD

The present disclosure relates generally to mapping/demapping SONET/SDH over Ethernet.

BACKGROUND OF THE INVENTION

A list of the abbreviations utilized is presented to facilitate the reading of the specification.
list of abbreviations
TDM—Time Division Multiplexing
SONET—Synchronous Optical Network
SDH—Synchronous Digital Hierarchy
L2/L2—Layer 2/Layer 3
VCAT—Virtual Concatenation
LCAS—Link Capacity Adjustment Scheme
GFP—Generic Framing Procedure
TOH—Transport Overhead
LAN—Local Area Network
MSPP—Multi-Service Provisioning Platform
IWF—Interworking Function
PLL—Phase-Locked Loop
FIFO—First In First Out
STM-n—Synchronous Transmission Module level n
GbE—Gigabyte Ethernet
SPE—Synchronous Payload Envelope
STS—Synchronous Transport Signal
CES—Circuit Emulation Services Operators of both enterprise and public networks strive to deliver 100% user access to data resources. Being able to reduce scheduled network downtime set aside for router software changes goes a long way toward achieving this goal.

Network core technologies have evolved from TDM technology, mostly SONET/SDH based, to packet L2/L3 technologies, mostly Ethernet based. Various techniques have been developed to allow users of one core technology to interface with the other core technology.

For example, technologies and applications such as VCAT/LCAS and GFP have solved the problem of transporting Ethernet and other packet formats over the TDM network.

However, as the packet based core network becomes predominant, the process of mapping/demapping SONET/SDH frames over Ethernet in cost effective and deployable ways becomes crucial for the migration of legacy TDM network core technology to packet network core technology.

Mapping of the SONET/SDH synchronous bit stream to Ethernet consists of the process of packetizing the synchronous bit stream into Ethernet packets. The entire bit stream, including TOH and payload bytes, is packetized so the signaling protocol of the SONET/SDH synchronous bit stream is transparently transported over Ethernet. The TOH bytes include a pointer at locations H1 and H2 and an H3 byte that can be used during positive justification. The demapping of the SONET/SDH synchronous bit stream from the Ethernet packets requires clock recovery and synchronization.

DESCRIPTION OF EXAMPLE EMBODIMENTS

Overview

In an example embodiment, received SONET frame data is read from a first FIFO at a first clock rate, with the received SONET frame data including transport overhead (TOH) bytes and payload bytes extracted from payloads of Ethernet frames.

Only received SONET frame payload bytes are written to a second FIFO at the first clock rate.

Received SONET frame payload bytes are read from the second FIFO at a reference clock rate and the number of bytes stored in the second FIFO is compared to a target value.

A new pointer is formed either by incrementing a received pointer, included in the TOH bytes, if the number of bytes in the second FIFO is greater than the target value, or by decrementing the received pointer if the number of bytes in the second FIFO is less than the target value. The new pointer is inserted into the TOH bytes of an outgoing SONNET frame.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

Figure 1:
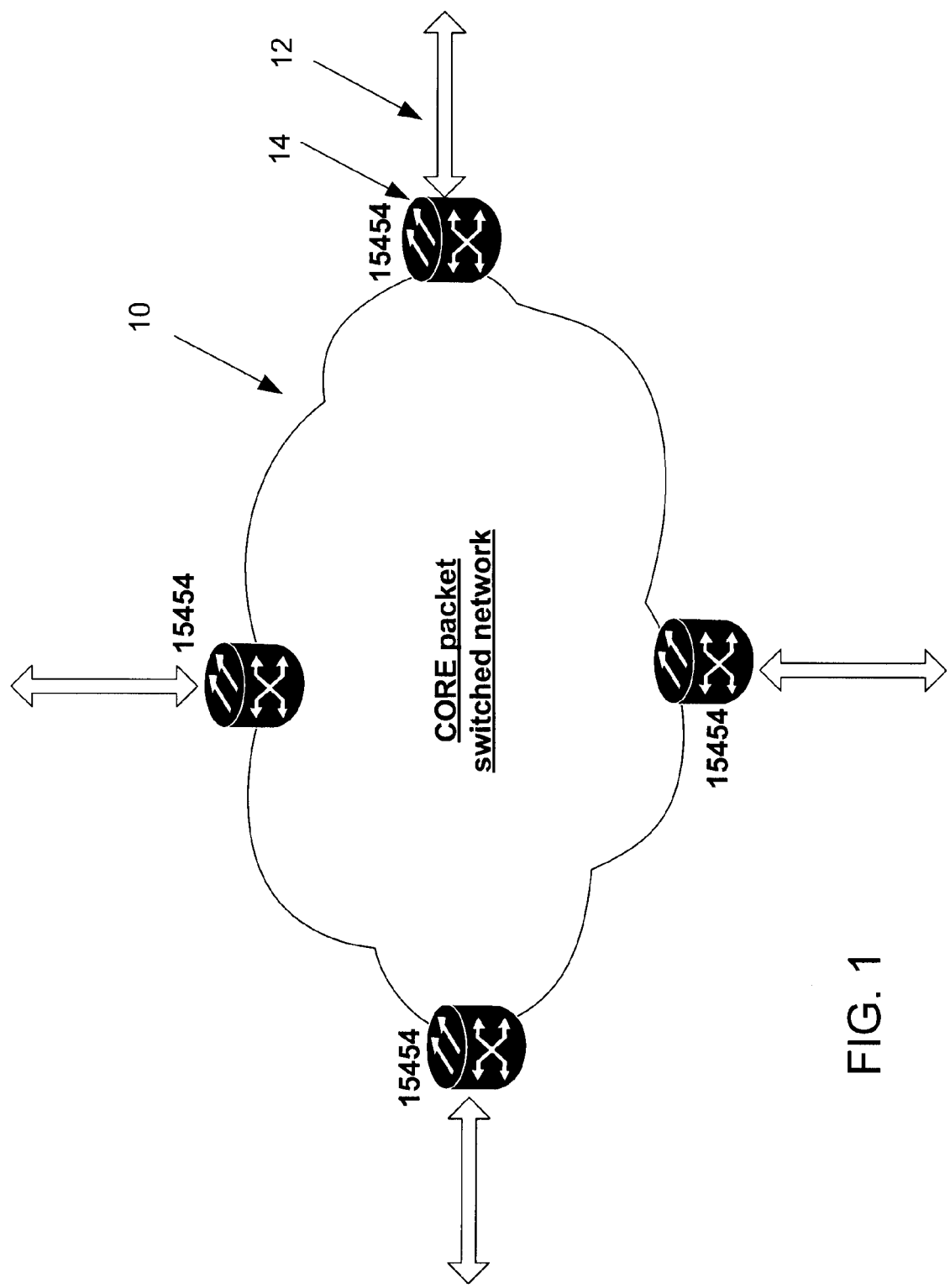
FIG. 1 illustrates an example of a core packet switched network.

FIG. 1 depicts an example of an existing network having a packet switched core network 10 and packet switched LANs 12 coupled by an MSPP 14 such as the Cisco® ONS 15454. The MSPPs provide multi-service aggregation and support functions but do not provide IWFs connecting different network core technologies such as TDM and packet.

The demapping of the SONET/SDH synchronous bit stream requires clock processing of the bit stream recovered from the Ethernet frames. This clock processing can be addressed with existing technologies like adaptive or differential timing which requires very complex circuitry based on analog PLLs that are difficult to integrate on a single card. Another existing clock processing technique is based on re-timing SONET/SDH after demapping with a Stratum 3 clock. This can be achieved by means of an MSA which is complex and expensive, although integration on a single card is possible.

In the following, various example embodiments will be described for demapping a SONET/SDH synchronous bit stream delivered in the payloads of Ethernet packet that insert a pointer offset at a demapping point of SONET/SDH from Ethernet. Instead of adopting a full pointer generation process, an offset is added to or subtracted from the incoming pointer included in the demapped SONET/SDH bit stream based on the difference between a reference clock and a client clock.

The entire SDH/SONET frame is stored in a FIFO memory after descrambling, and depending on the FIFO status (almost full/almost empty) the pointer offset is added or subtracted. In normal conditions this operation frees up the FIFO by following the pointer justification rules. In abnormal conditions an incoming justification is transparently carried or processed. The pointer offset calculation can be made by software, thus removing unnecessary hardware.

Figure 2:
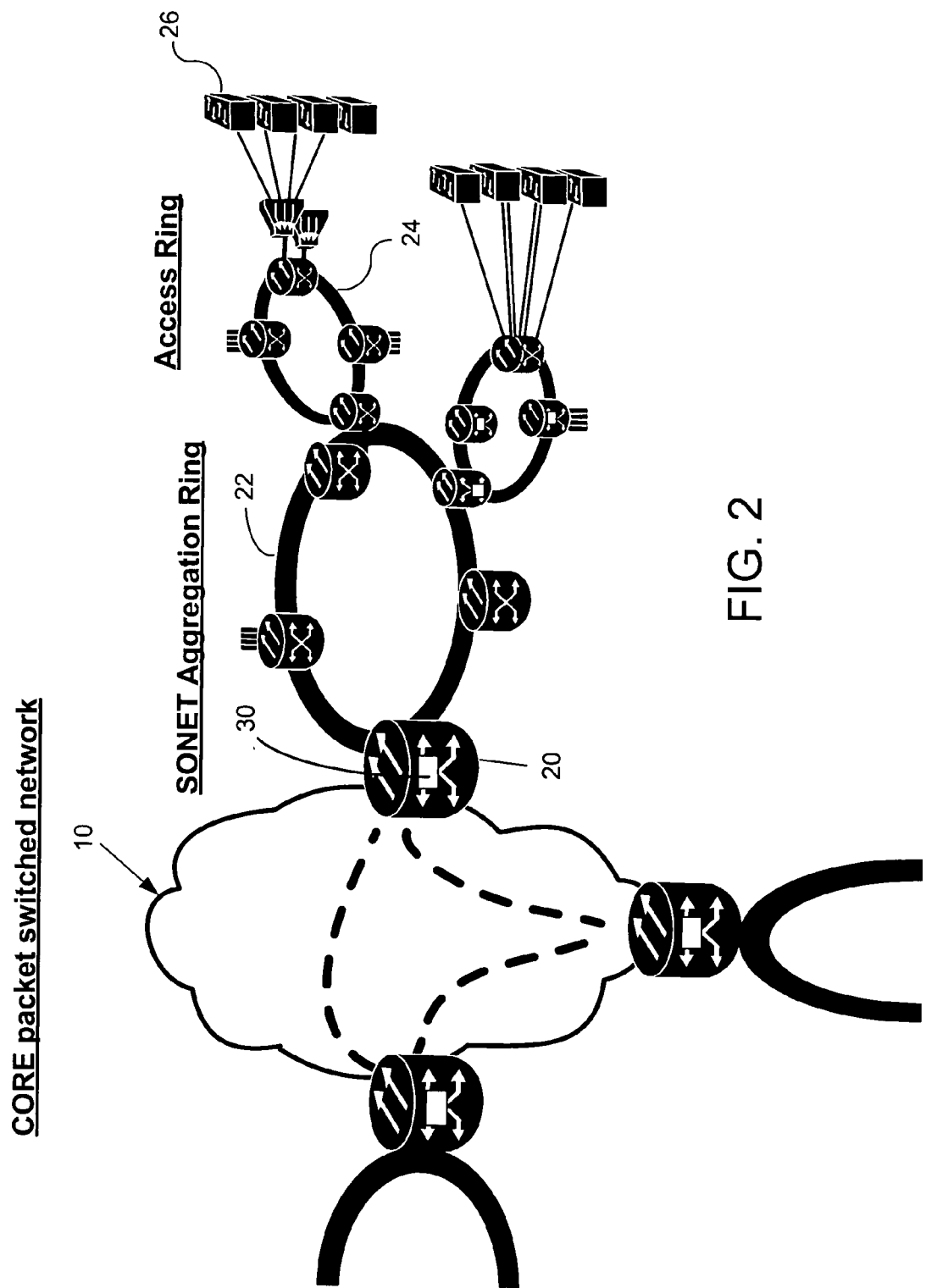
FIG. 2 illustrates an example network architecture utilizing example embodiments.

FIG. 2 depicts an example of a network that includes a point for demapping SONET/SDH from Ethernet. In FIG. 2 a gateway device 20 couples the packet switched core network 10 to a SONET aggregation ring 22. The SONET aggregation ring 22 is coupled to access ring 24 which is coupled to various edge devices or switches 26. A SONET/SDH from Ethernet demapping module 30 is included in the gateway device 20.

Figure 3:
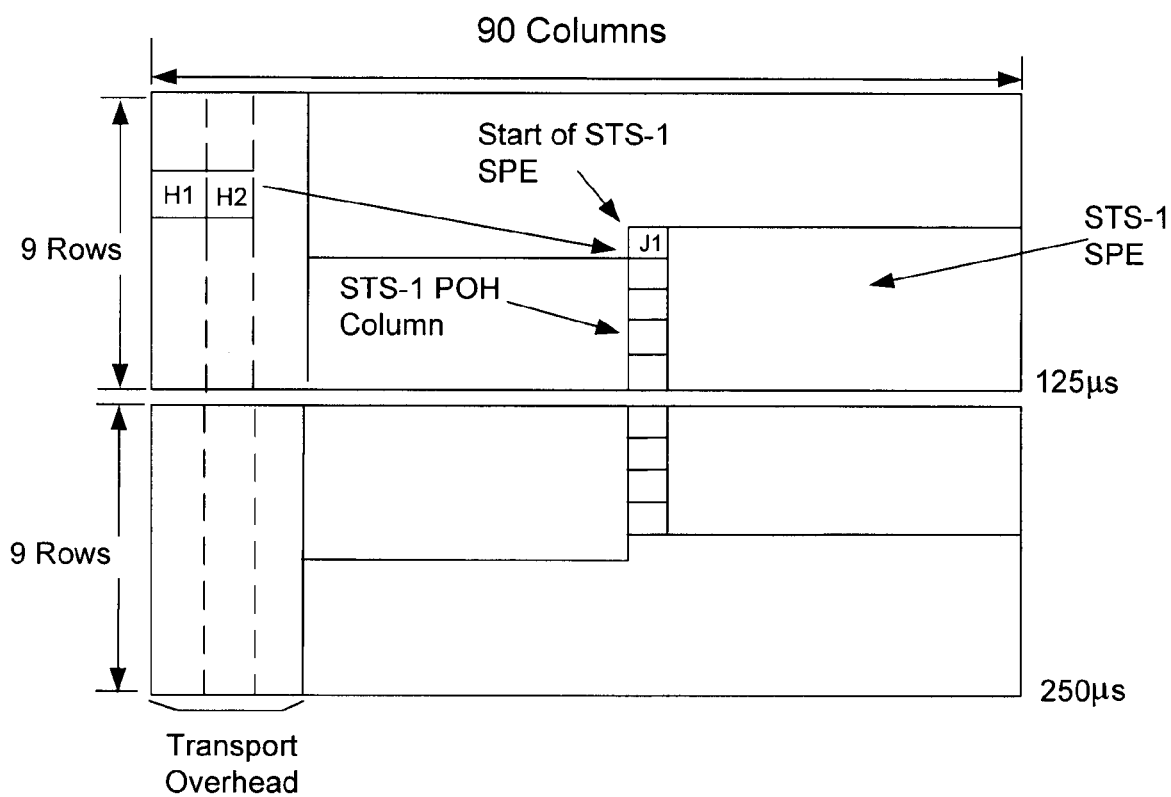
FIG. 3 illustrates and example of an STS-1 pointer.

As depicted in FIG. 3, SONET users pointers to localize individual SPEs in the payload of the STS. The TOH bytes of a SONET frame include H1, H2, and H3 bytes which are designated pointer bytes. By using a pointer SONET compensates for frequency variations between clocks operating at nodes in the network.

Figure 4:
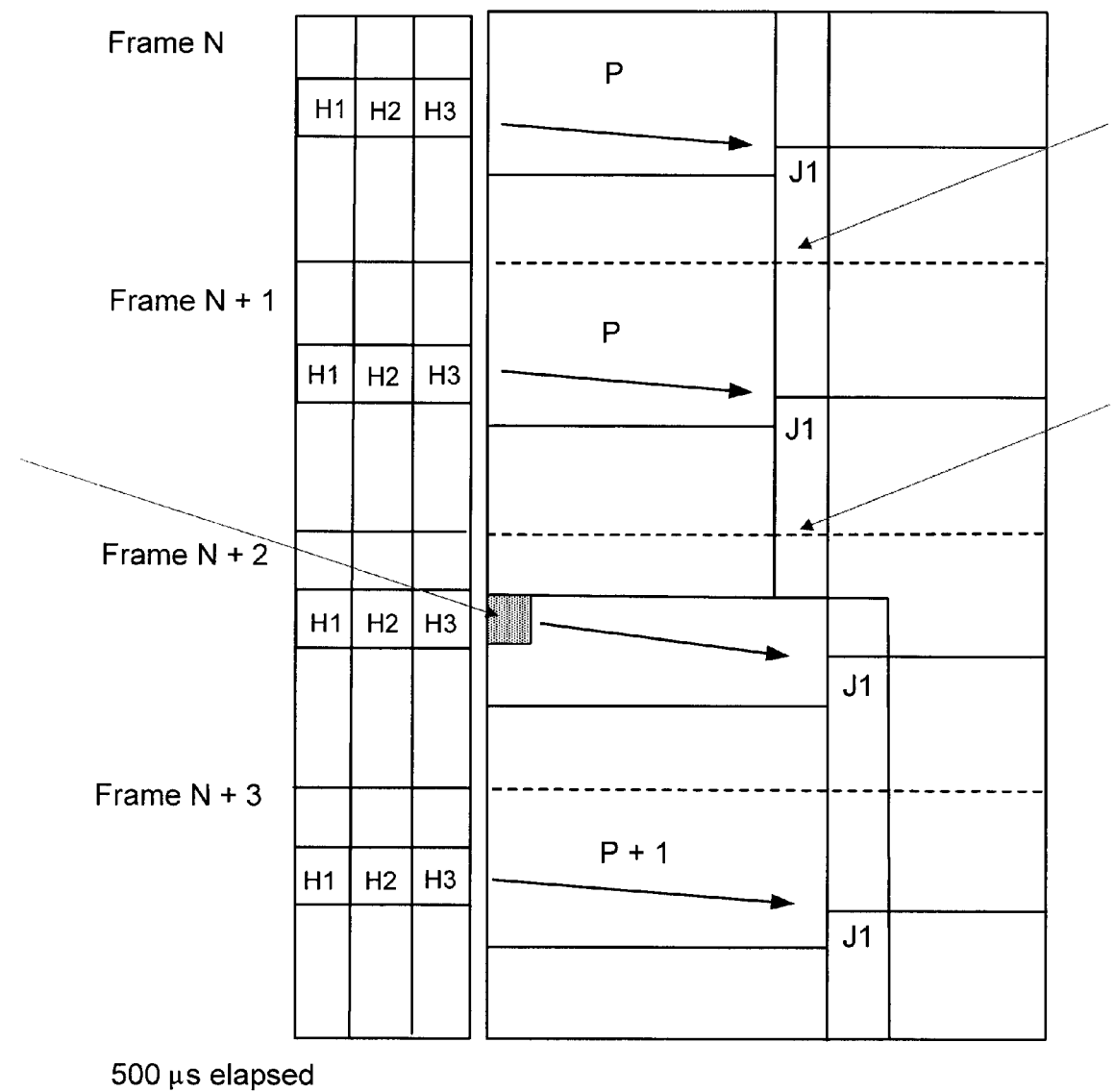
FIG. 4 illustrates an example of positive justification.

As depicted in FIG. 4, if the frame rate at a node is too slow then frames are being read at too fast a rate and the buffer is being emptied too fast. To compensate and allow the buffer to refill, a dummy byte is stuffed into the payload and the pointer indicating the beginning of the payload is incremented (positive justification).

Figure 5:
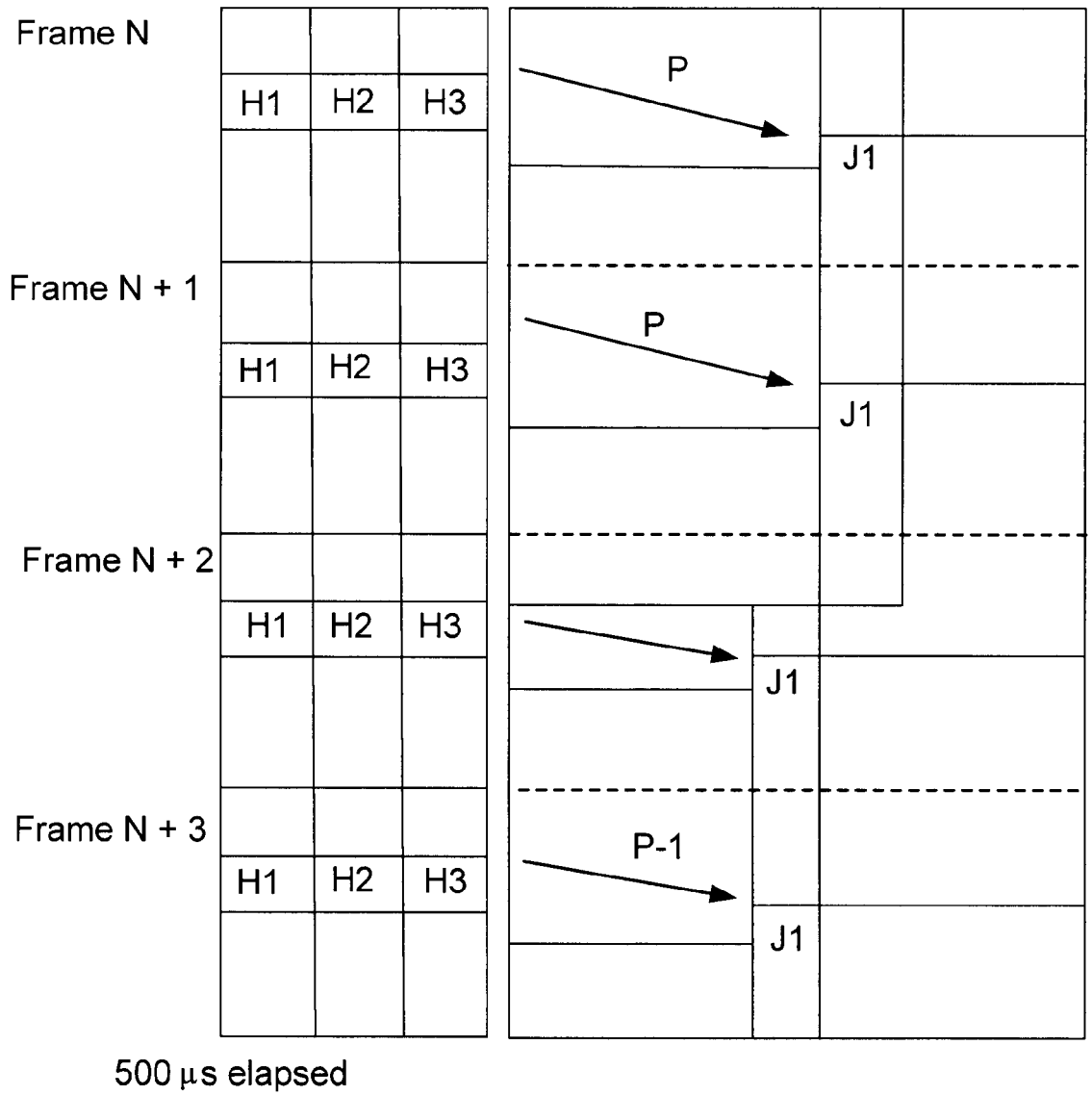
FIG. 5 illustrates and example of negative justification.

As depicted in FIG. 5, if the frame rate at a node is too fast then frames are being read too slowly and the buffer is not being emptied fast enough. To compensate and allow the buffer to empty an extra byte is read into the H3 byte of the pointer and the pointer indicating the beginning of the payload is decremented (negative justification).

Figure 6:
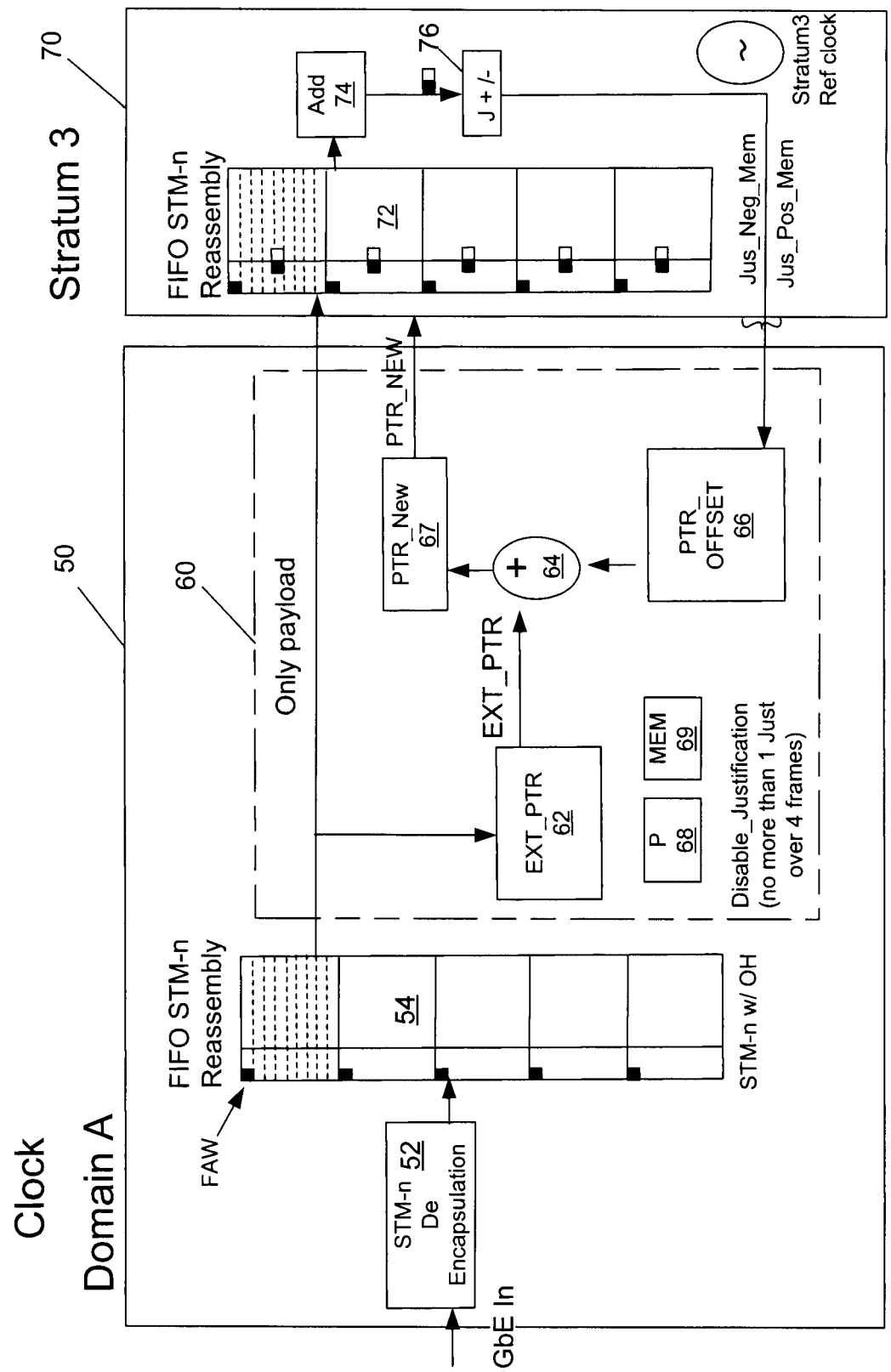
FIG. 6 illustrates an example embodiment.

FIG. 6 is a block diagram depicting an example embodiment. In FIG. 6 a first clock domain A 50 includes an STM-n de-encapsulation block 52 that has an input coupled to receive GbE packets and an output coupled to a CLK A STM-n Reassembly FIFO 54. The output of the CLK A STM-n Reassembly FIFO 54 is coupled to a pointer processing circuit 60.

The pointer processing circuit 60 includes an EXT_PTR processing block 62 having an input coupled to receive data output from the CLK A STM-n Reassembly FIFO 54 and an output. An adder 64 has a first input coupled to the output of the EXT_PTR processing block 62, a second input, and an output. A PTR_OFFSET block 66 has an output coupled to the second input of the adder and an input coupled to receive a memory justification signal (Jus_Neg_Mem or Jus_Pos_Mem). A PTR_New processing block 67 has an input coupled to the output of the adder 64 and an output. In this example embodiment the pointer processor processing blocks are controlled by a processor 68 executing program code held in a memory 69. Only data paths (not control paths) of the pointer processing circuit are depicted in FIG. 5.

A Stratum 3 reference clock domain 70 includes a REF CLK STM-n Reassembly FIFO 72 having an input coupled to the output of the pointer processing circuit 60 and having an output. A counter unit 74 coupled to the REF CLK STM-n Reassembly FIFO 72 counts the amount of data in the REF CLK STM-n Reassembly FIFO 72. A justification signal generator 76 has an input coupled to the counter unit 74 and an output coupled to the PTR_OFFSET block 66.

The operation of the example embodiment depicted in FIG. 5 will now be described with reference to the flow charts of FIGS. 7 and 8. This embodiment implements part of Circuit Emulation Services (CES) over Ethernet that provides a virtual circuit that enables a TDM service, such a SONET, to utilize a packet-switched network such as Ethernet.

In this embodiment, the STM-n De-Encapsulation block 52 removes entire SONET frames, including payload and overhead bytes, from the payloads of received GbE frames and reassembles the SONET frames in the CLK A STM-n Reassembly FIFO 54. This reassembly uses standard techniques to take into account the possible out of order receipt of packets and network latencies.

Figure 7:
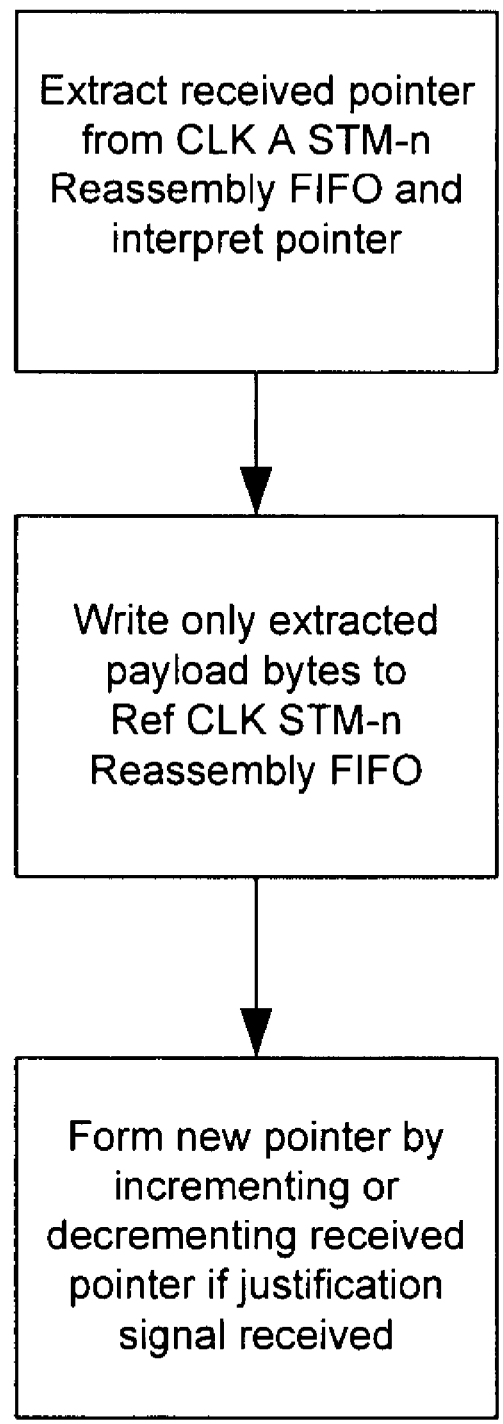
FIG. 7 is a flow chart illustrating the operation of an example embodiment of a pointer generation circuit.

Referring first to FIG. 7, which illustrates the operation of the pointer processing circuit 60, the pointer processing circuit reads data from the CLK A STM-n Reassembly FIFO 54 to locate the pointer, interprets the pointer to identify the first byte of the payload, and writes only the payload bytes into the REF CLK STM-n Reassembly FIFO 72.

If a Jus_Neg_Mem signal is received the PTR_OFFSET block 66 outputs a −1 to the adder 64. The adder 64 then adds −1 (decrements) the received pointer output by the EXT_PTR block 62 and stores the decremented new pointer in the PTR_New block 68.

The decremented pointer would then be inserted into the H2 and H3 locations in the transport bytes of the outgoing SONET frame and a data byte would then be written from the REF CLK STM-n Reassembly FIFO 72 into the H3 location of the outgoing SONET frame.

If a Jus_Pos_Mem signal is received the PTR_OFFSET block 66 outputs a +1 to the adder 64. The adder 64 then adds +1 (increments) the received pointer output by the EXT_PTR block and stores the incremented new pointer in the PTR _ New block 68.

The incremented pointer would then be inserted into the H2 and H3 locations in the transport bytes of the outgoing SONET frame and a dummy or blank byte would be written at the data byte location following the H3 location.

Figure 8:
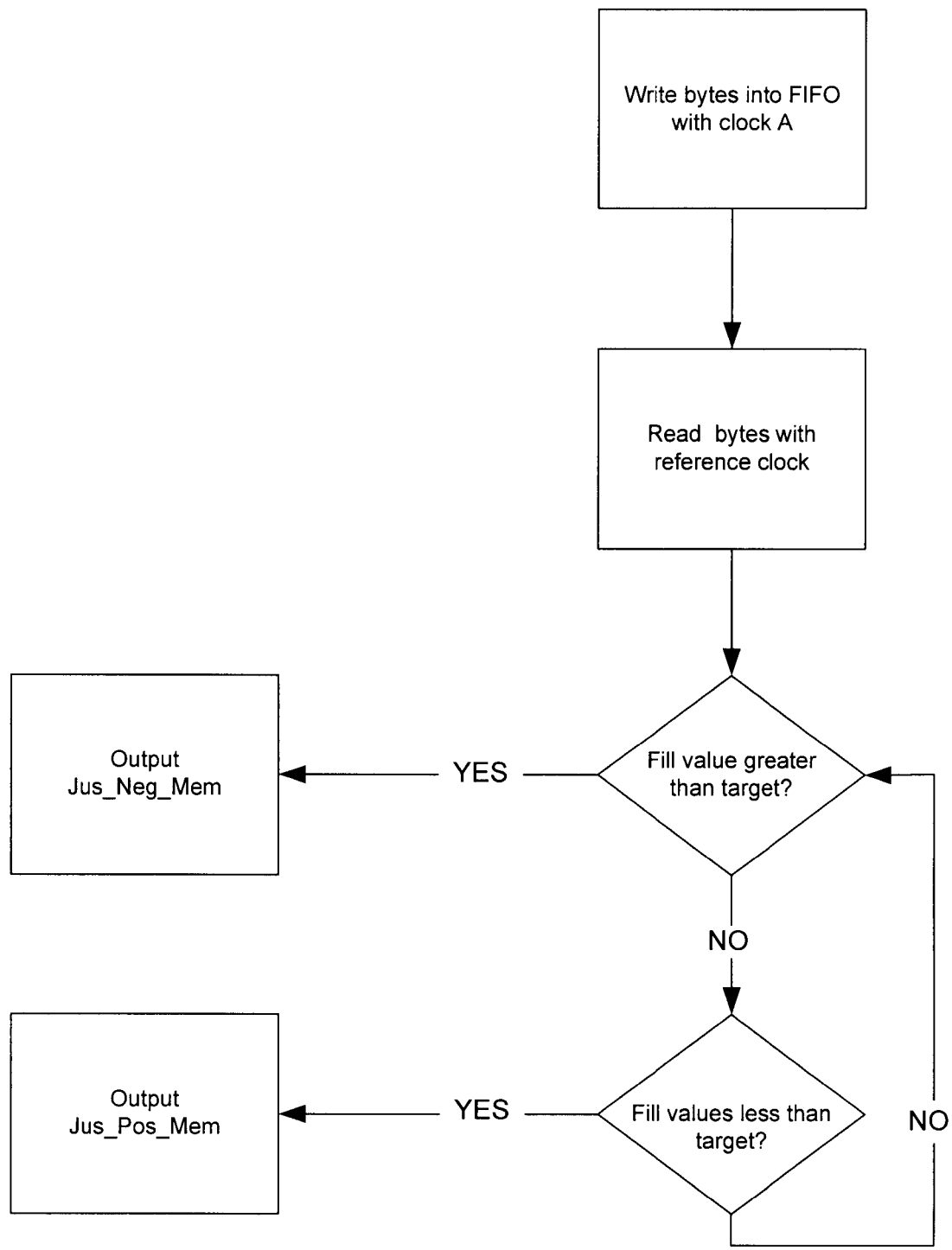
FIG. 8 is a flow chart illustrating the operation of an example embodiment of pointer offset generation.

Referring now to FIG. 8, which illustrates the operation of the reference clock domain 70, payload bytes are written to the REF CLK STM-n Reassembly FIFO 72 using clock A. The payload bytes from the REF CLK STM-n Reassembly FIFO 72 are read utilizing the Stratum 3 clock and transferred to a SONET framing block where outgoing SONET frames are formed by a multiplexer (not shown) followed by an overhead insertion circuit (not shown) that restores new transport overhead bytes to an outgoing SONET frame.

As is known in the art, the number of bytes stored in the REF CLK STM-n Reassembly FIFO 72 is kept at a nearly constant level. For example, if the REF CLK STM-n Reassembly FIFO 72 held 30 bytes then initially 15 bytes would be written to the REF CLK STM-n Reassembly FIFO 72 before any bytes were read. Once reading begins using the Stratum 3 reference clock the number of bytes in the FIFO would remain constant at 15 bytes (with slight variation as overhead bytes are processed) if CLK A had the same frequency as the reference clock.

In this example embodiment, the pointer inserted into an outgoing frame is constructed from the received pointer extracted from the incoming Ethernet packets held in the CLK A STM-n Reassembly FIFO 54. This received pointer is held in the EXT_PTR block 62.

The counter unit 74 outputs a fill value indicating the number of bytes held in the REF CLK STM-n Reassembly FIFO 72. The justification signal generator 76 compares the fill value to a target value (in this example 15).

If the fill value is greater than the target value then bytes are being written to the REF CLK STM-n Reassembly FIFO 72 by clock A at a faster rate than bytes are being read from the REF CLK STM-n Reassembly FIFO 72 by the reference Stratum 3 clock. In this case, the justification signal generator outputs a Jus_Neg_Mem signal to the PTR_OFFSET block 66.

If the fill value is less than the target value then bytes are being written to the REF CLK STM-n Reassembly FIFO 72 by clock A at a slower rate than bytes are being read from the REF CLK STM-n Reassembly FIFO 72 by the reference Stratum 3 clock. In this case, the justification signal generator outputs a Jus_Pos_Mem signal to the PTR_OFFSET block 66.

As described above, the algorithms depicted in FIGS. 6 and 7 can be encoded in software executed by the processor 68.

The invention has now been described with reference to the example embodiments. Alternatives and substitutions will now be apparent to persons of skill in the art. For example, the example embodiment described utilizes a processor executing program code to perform the algorithms described in FIGS. 6 and 7. Alternatively, these algorithms can be performed by program logic implemented, for example, in an application specific integrated circuit (ASIC). The algorithms described can be encoded into logic utilizing a hardware description language. Accordingly, it is not intended to limit the invention except as provided by the appended claims.

What is claimed is:

1. A method of demapping a SONET synchronous bit frame from received Ethernet frames comprising:
    reading received SONET frame data from a first reassembly FIFO at a first clock rate, with the received SONET frame data including transport overhead (TOH) bytes including pointers that indicate the beginning of SONET frame payload bytes and SONET frame payload bytes, with the TOH bytes and SONET frame payload bytes extracted from payloads of the received Ethernet frames;
    writing only received SONET frame payload bytes to a second reassembly FIFO at the first clock rate;
    reading received SONET frame payload bytes from the second reassembly FIFO at a reference clock rate;
    indicating the number of bytes stored in the second reassembly FIFO;
    comparing the number of bytes stored in the second reassembly FIFO to a target value;
    generating a negative justification signal if the number of bytes held in the second reassembly FIFO is greater than the target value;
    generating a positive justification signal if the number of bytes held in the second reassembly FIFO is less than the target value;
    reading a received pointer value, included in the TOH bytes of the received SONET frame, from the first reassembly FIFO;
    forming a new pointer value by decrementing the received pointer value if the negative justification signal is generated or incrementing the received pointer if the positive justification signal is generated; and
    inserting the new pointer value into H2 and H3 locations of transport bytes of the TOH in an outgoing SONET frame being reassembled in the second reassembly FIFO.

2. The method of claim 1 where reading received SONET frame payload bytes from the second reassembly FIFO further comprises:
    waiting until the number of bytes stored in the second reassembly FIFO is equal to the target value before starting to read bytes from the second reassembly FIFO.

3. The method of claim 1 where:
    the reference clock rate is a Stratum 3 clock rate.

4. An apparatus comprising:
    a first FIFO configured to store received SONET frame data, with the received SONET frame data including transport overhead (TOH) bytes and payload bytes, extracted from payloads of Ethernet frames at a client clock rate;
    a second FIFO configured to read out data at a reference clock rate;
    a pointer generation circuit having a data input coupled to the first FIFO, a data output coupled to the second FIFO, a justification signal input, and a new pointer output, with the pointer generation circuit configured to write only received SONET frame payload bytes to the second FIFO at the first clock rate, to output a new pointer generated by decrementing a received pointer, included in the TOH bytes, if a negative justification signal is received or by incrementing the received pointer if a positive justification signal is received;
    a counter unit, having an input coupled to the second FIFO and an output, with the counter unit configured to output a fill value signal indicating the number of bytes held in the second FIFO;
    a justification signal generating unit, having an input coupled to the output of the counter unit and an output coupled to the pointer generator circuit, with the justification signal generating unit configured to output a negative justification signal if the number of bytes held in the second FIFO is greater than a target value or to output a positive justification signal if the number of bytes held in the second FIFO is less than the target value.

5. The apparatus of claim 4 where the justification signal generating unit further comprises:
    a processor;
    a memory holding program code to be executed by the processor to output a negative justification signal if the number of bytes held in the second FIFO is greater than a target value or to output a positive justification signal if the number of bytes held in the second FIFO is less than the target value.

6. An apparatus configured to demap a SONET synchronous bit frame from received Ethernet frames comprising:
    a processor; and
    a memory in communication with the processor, the memory storing program instructions, the processor operative with the program instructions to:
    read received SONET frame data from a first reassembly FIFO at a first clock rate, with the received SONET frame data including transport overhead (TOH) bytes including pointers that indicate the beginning of SONET frame payload bytes and SONET frame payload bytes, with the TOH bytes and SONET frame payload bytes extracted from payloads of the received Ethernet frames;
    write only received SONET frame payload bytes to a second reassembly FIFO at the first clock rate;
    read received SONET frame payload bytes from the second reassembly FIFO at a reference clock rate;
    indicate the number of bytes stored in the second reassembly FIFO;

compare the number of bytes stored in the second reassembly FIFO to a target value;
generate a negative justification signal if the number of bytes held in the second reassembly FIFO is greater than the target value;
generate a positive justification signal if the number of bytes held in the second reassembly FIFO is less than the target value;
read a received pointer value, included in the TOH bytes of the received SONET frame, from the first reassembly FIFO;
form a new pointer value by decrementing the received pointer value if the negative justification signal is generated or incrementing the received pointer if the positive justification signal is generated; and
insert the new pointer value into H2 and H3 locations of transport bytes of the TOH in an outgoing SONET frame being reassembled in the second reassembly FIFO.

7. The apparatus of claim 6 with the processor further operative with the program instruction to:
wait until the number of bytes stored in the second reassembly FIFO is equal to the target value before starting to read bytes from the second reassembly FIFO.

8. The apparatus of claim 6 where:
the reference clock rate is a Stratum 3 clock rate.

9. One or more non-transitory computer readable storage media with an executable program stored thereon, wherein the program instructs a processor to perform the following steps to demap a SONET synchronous bit frame from received Ethernet frames comprising:
reading received SONET frame data from a first reassembly FIFO at a first clock rate, with the received SONET frame data including transport overhead (TOH) bytes including pointers that indicate the beginning of SONET frame payload bytes and SONET frame payload bytes, with the TOH bytes and SONET frame payload bytes extracted from payloads of the received Ethernet frames;
writing only received SONET frame payload bytes to a second reassembly FIFO at the first clock rate;
reading received SONET frame payload bytes from the second reassembly FIFO at a reference clock rate;
indicating the number of bytes stored in the second reassembly FIFO;
comparing the number of bytes stored in the second reassembly FIFO to a target value;
generating a negative justification signal if the number of bytes held in the second reassembly FIFO is greater than the target value;
generating a positive justification signal if the number of bytes held in the second reassembly FIFO is less than the target value;
reading a received pointer value, included in the TOH bytes of the received SONET frame, from the first reassembly FIFO;
forming a new pointer value by decrementing the received pointer value if the negative justification signal is generated or incrementing the received pointer if the positive justification signal is generated; and
inserting the new pointer value into H2 and H3 locations of transport bytes of the TOH in an outgoing SONET frame being reassembled in the second reassembly FIFO.

10. The non-transitory computer readable storage media of claim 9 where the program further instructs the processor to perform the following steps:
waiting until the number of bytes stored in the second reassembly FIFO is equal to the target value before starting to read bytes from the second reassembly FIFO.

11. The non-transitory computer readable storage media of claim 9 where the program further instructs the processor to perform the following step:
store an entire SONET/SDH frame in the first FIFO after descrambling.

12. The non-transitory computer readable storage media of claim 9 where the program further instructs the processor to perform the following step:
remove entire SONET frames, including payload and overhead bytes, from payloads of received Ethernet frames.

13. The non-transitory computer readable storage media of claim 9 where the program further instructs the processor to perform the following step:
interpret a pointer to identify the first byte of a SONET payload.

14. The non-transitory computer readable storage media of claim 9 where the program further instructs the processor to perform the following step:
insert a decremented pointer into the H2 and H3 locations of an outgoing SONET frame.

15. The non-transitory computer readable storage media of claim 9 where the program further instructs the processor to perform the following steps:
insert a pointer into an outgoing frame that is constructed from incoming Ethernet packets.

* * * * *